United States Patent
Haskins et al.

(10) Patent No.: US 9,581,252 B2
(45) Date of Patent: Feb. 28, 2017

(54) FLUID FLOW CONTROL VALVE AND ACTUATOR

(71) Applicant: AIRBUS OPERATIONS LIMITED, Bristol (GB)

(72) Inventors: Richard Haskins, Bristol (GB); John Jones, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 14/434,536

(22) PCT Filed: Oct. 15, 2013

(86) PCT No.: PCT/GB2013/052694
§ 371 (c)(1),
(2) Date: Apr. 9, 2015

(87) PCT Pub. No.: WO2014/060745
PCT Pub. Date: Apr. 24, 2014

(65) Prior Publication Data
US 2015/0276071 A1    Oct. 1, 2015

(30) Foreign Application Priority Data

Oct. 18, 2012    (GB) .................................. 1218764.7

(51) Int. Cl.
*F16K 25/00* (2006.01)
*F16K 3/312* (2006.01)
(Continued)

(52) U.S. Cl.
CPC ............... *F16K 3/312* (2013.01); *F16K 27/06* (2013.01); *F16K 43/00* (2013.01); *Y10T 137/6011* (2015.04)

(58) Field of Classification Search
CPC ........ F16K 3/312; F16K 27/06; F16K 27/062; F16K 27/065; F16K 27/067; F16K 43/00; Y10T 137/6011; Y10T 137/7504; Y10T 137/7668; Y10T 137/6035; Y10T 137/6038
(Continued)

(56) References Cited

U.S. PATENT DOCUMENTS 2,936,778 A * 5/1960 Stillwagon ................ F16K 1/22
                                                    137/454.6
3,150,681 A    9/1964 Hansen et al.
(Continued)

FOREIGN PATENT DOCUMENTS

DE    39 05 655    8/1990
EP    0 132 989    2/1985
(Continued)

OTHER PUBLICATIONS

International Search Report for PCT/GB2013/052694 mailed Jan. 30, 2014, 4 pages.
(Continued)

*Primary Examiner* — Jessica Cahill
(74) *Attorney, Agent, or Firm* — Nixon & Vanderhye P.C.

(57) ABSTRACT

A fluid flow control valve is housed within a canister (31) which is semi-permanently fixed in the wall (12) of a fuel tank, and has pipe connections (17, 18). The movable valve parts, including a valve sub-assembly (32, 33) and an electrical actuator (34), may be removed without requiring access to the fuel tank.

19 Claims, 6 Drawing Sheets

(51) Int. Cl.
*F16K 43/00* (2006.01)
*F16K 27/06* (2006.01)

(58) Field of Classification Search
USPC .................................................. 251/315.12
See application file for complete search history.

(56) References Cited

U.S. PATENT DOCUMENTS

| | | | | |
|---|---|---|---|---|
| 3,498,585 A | * | 3/1970 | Kirk | F16K 5/202 |
| | | | | 251/315.12 |
| 3,554,488 A | * | 1/1971 | Alexander | F16K 5/0264 |
| | | | | 251/317 |
| 3,717,323 A | * | 2/1973 | Geipel | F16K 5/201 |
| | | | | 251/315.13 |
| 4,460,012 A | | 7/1984 | Koumi et al. | |
| 4,562,860 A | * | 1/1986 | Walter | F16K 5/0636 |
| | | | | 137/454.6 |
| 4,953,587 A | * | 9/1990 | Steele | F16K 5/202 |
| | | | | 137/315.19 |
| 7,267,323 B1 | * | 9/2007 | O'Callaghan | F16K 5/0636 |
| | | | | 251/163 |
| 2001/0045231 A1 | | 11/2001 | Monod | |
| 2009/0159239 A1 | | 6/2009 | Desai et al. | |
| 2011/0180663 A1 | | 7/2011 | Mougin | |

FOREIGN PATENT DOCUMENTS

| | | |
|---|---|---|
| EP | 0 303 453 | 2/1989 |
| GB | 125 023 | 4/1919 |
| GB | 1 202 141 | 8/1970 |
| WO | WO 90/04123 | 4/1990 |

OTHER PUBLICATIONS

Written Opinion of the International Searching Authority for PCT/GB2013/052694, mailed Jan. 30, 2014, 4 pages.
Search Report for GB 1218764.7, dated Nov. 23, 2012, 1 page.

* cited by examiner

FLUID FLOW CONTROL VALVE AND ACTUATOR

RELATED APPLICATIONS

This application is the U.S. national phase of International Application No. PCT/GB2013/052694, filed 15 Oct. 2013, which designated the U.S. and claims priority to GB Patent Application No. 1218764.7, filed 18 Oct. 2012, the entire contents of each of which are hereby incorporated by reference.

BACKGROUND OF INVENTION

This invention relates to a valve and actuator, suitable for controlling flow of fluids in a duct.

Fluid flow valves are well known and generally comprise a housing defining an inlet and an outlet, and a movable valve member within the housing, having an internal through passageway to connect the inlet and outlet. The valve member is pivotable or rotatable between an open condition in which the inlet and outlet is connected and a closed condition in which the inlet and outlet are not connected.

Typically the valve member has a pivot axis perpendicular to the internal through passage, which is straight. Thus movement between the open and closed conditions requires a quarter turn. It will be appreciated that the valve member may also throttle flow in a partly closed condition.

An actuator may be provided to move the valve member, and is typically an electric motor and gearbox responsive to an electrical control signal.

Fluid ducts connected to the inlet and outlet are usually spaced away from a wall to which the valve is mounted, so as to give access for connection and disconnection. In consequence the valve may be attached to a pedestal, so that the valve is spaced from the mounting wall by a suitable distance.

Valves of this kind are used in aircraft to control the flow of fuel, and typically are mounted on the inside face of a fuel tank wall. The corresponding actuator is mounted on the outside face of the tank wall, typically in a contained space, and drives the movable valve member via a shaft passing through the pedestal. The actuator may be behind a fairing or false works which require to be removed for access.

Maintenance and repair of such valves can be problematic. If a pedestal or valve requires replacement, access to the wet side of the fuel tank is required, and the fuel tank may require to be drained. Replacement of an actuator requires access to the confined space on the dry side of the fuel tank.

Furthermore the existing arrangement of actuator, ball valve and pedestal cannot be quickly assembled and tested in a new aircraft.

SUMMARY OF INVENTION

What is required is an improved arrangement whereby better access to an actuator and fluid control valve is provided, in particular without entering the wet side of a fuel tank.

According to a first aspect of the invention, there is provided a valve assembly comprising: a blind canister defining an insertion axis passing centrally through the internal volume and open end thereof; a close-fitting blind valve housing slidable into said canister on said axis and defining an open mouth and a circular chamber about said axis; a close-fitting valve member insertable through said mouth and pivotable in said chamber; and an actuator insertable through said mouth for operational engagement with said valve member, said canister and housing defining aligned inlet and outlet ports, and said valve member including a through passage for allowing connection of said inlet and outlet ports in one orientation thereof, and for obstructing connection of said inlet and outlet ports in another orientation thereof.

The invention allows the blind canister to be installed in an opening in, for example, a fuel tank, and the inlet and outlet of the canister to be connected to ducts or pipes. In use, the valve housing and valve member are removable from the canister through the open end thereof, for repair or replacement; access to the remote side of the canister is not required, and in a fuel tank installation this means that access to the wet side is not necessary. Furthermore, the fuel tank may not be required to be drained because the pipe connections are not disturbed.

The actuator may also be removed from the valve housing for repair or replacement.

A notable feature of the invention is that the canister, valve housing, valve and actuator can be supplied and installed as a pre-tested assembly which requires only pipe connections and mounting via for example an external flange of the canister and/or valve housing.

In an embodiment of the invention a spring loaded slide valve or sluice is provided for the inlet and outlet ports, and housed within one or more cavities of said canister. Removal of the valve housing along said axis causes said valve or valves to automatically close over the inlet and outlet ports of the canister. Insertion of the valve housing causes said valve or valves to retreat, so as to permit alignment of the inelt and outlet ports of housing and canister. The housing may contact the valve or valves directly, and be inserted against the spring loading thereof. In one embodiment a sleeve valve is provided for close fitting within a circular internal wall of the canister.

The provision of such a valve or sluice has the effect of closing the inlet and outlet of the canister, and may be arranged to give a fluid tight seal. The possibility of ingress of foreign matter through the inlet and outlet ports is obviated. Furthermore the spring loading imparts an outward urge on the valve housing, which may aid removal thereof.

According to a second aspect of the invention there is provided a method of installing a valve assembly in an opening of a fuel tank of an aircraft, said valve assembly having inlet and outlet connections within said tank, and the method comprising providing a valve assembly according to the first aspect of the invention, inserting said valve assembly through the opening in said fuel tank, connecting said inlet and outlet connections respectively to inlet and outlet parts of the canister, and attaching said valve assembly in a sealed condition to the periphery of the opening in said fuel tank.

The method of the invention allows removal of the valve housing and valve member whilst leaving the canister connected to the inlet and outlet, and sealed within the fuel tank. The actuators may also be removed without disturbing the valve housing and valve member.

The invention also provides a method for maintenance and/or repair of a valve assembly installed by the method of the second aspect of the invention, this method comprising removal and replacement of the working components of the valve assembly whilst leaving the canister of the valve assembly undisturbed. The working components of the valve assembly generally comprise a valve sub-assembly of valve housing and valve member, and an actuator for the valve member. These components may be removed in sequence, or together as a unit.

SUMMARY OF DRAWINGS

Other features of the invention will be apparent from the following description of a preferred embodiment illustrated by way of example only in the accompanying drawings, in which.

DETAILED DESCRIPTION OF AN EMBODIMENT OF THE INVENTION

Figure 1:
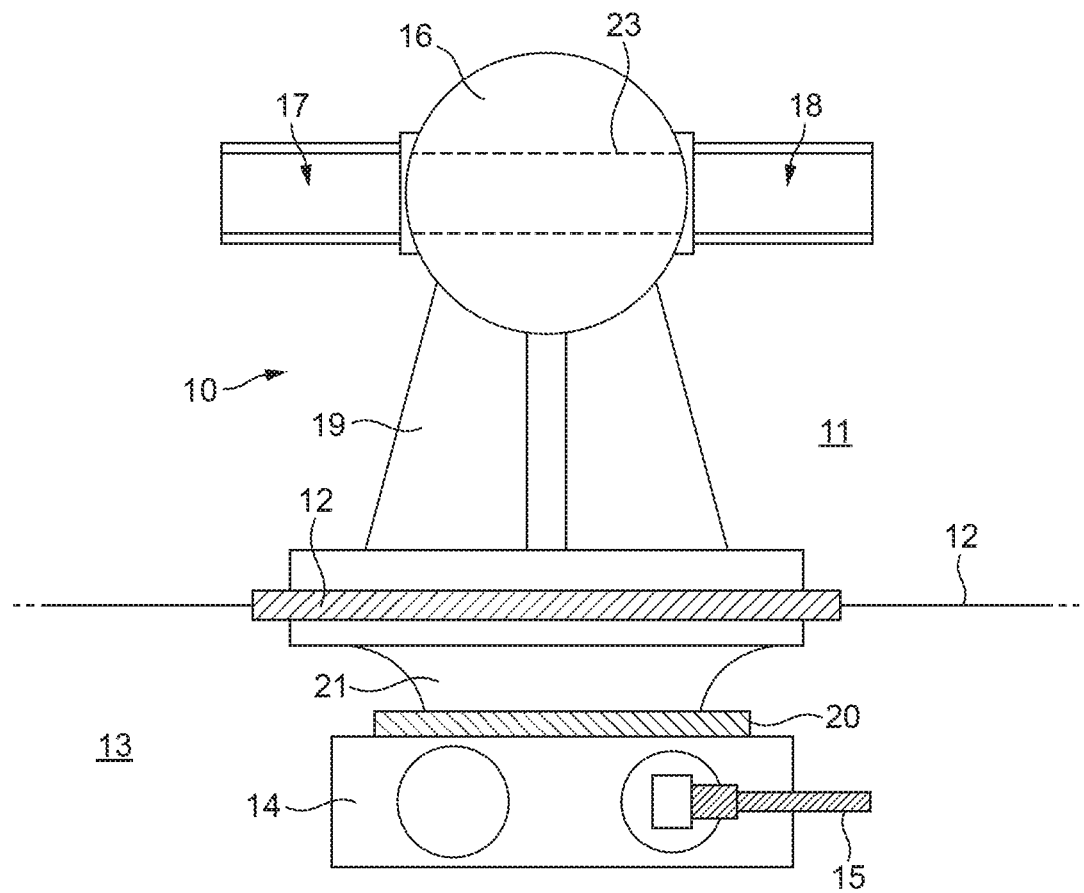
FIG. 1 is a schematic side view of a prior art installation of a valve assembly in a fuel tank.

With reference to FIG. 1, a prior art valve assembly 10 is located on the wet side 11 of a fuel tank wall 12. On the dry side 13, typically in a closed compartment, is provided an electrical actuator 14 for the valve assembly 10; the actuator 14 has the usual power and control connection 15, typically part of a wiring harness.

The valve assembly comprises a housing 16 containing a ball valve or the like, by which communication between pipe connections 17, 18 can be opened and closed. The pipe connections consist of any suitable fluid coupling, for example coupled (bolted) pipe flanges or compression joints.

A pedestal 19 is provided to space the housing away from the tank wall 12, and is fixed to the tank wall by any suitable kind of fastener, for example a row of threaded fasteners.

The actuator 14 is attached to a mounting 21 which is in turn affixed to the tank wall 12; a V band clamp 20 may be used. A shaft of the actuator (not shown) passes through the tank wall via a suitable seal and pivots or rotates the ball valve on demand to throttle the through connection between the pipe connections. Typically a quarter turn of the actuator shaft will turn the ball valve so that the through connection 23 either connects the pipe connections, as illustrated, or obstructs connection.

In use the pedestal 19 is mounted from the wet side 11, and any failure thereof requires access from the wet side for disassembly. This in turn requires draining and venting of the fuel tank, which can be hazardous, expensive and time consuming. The actuator may be serviced from the dry side 13 but access may be difficult if the contained space is confined so that mounting fasteners are not readily accessible.

The invention is illustrated by reference to FIGS. 2-4. The fuel tank wall 12 defines a wet side 11 and a dry side 13 as before. Pipe connections 17, 18 are provided, as before.

A valve assembly 30 comprises an open mouthed canister 31 within which is fitted a valve sub-assembly consisting of valve housing 32 and ball valve 33, and a valve actuator 34. The power/control lead 15 of the actuator is provided, as before.

The canister has an external outwardly extending flange 35 which determines the insertion depth thereof through an opening in the tank wall 12. Fasteners 36, typically a captive nut and screw, retain the canister in the tank wall, and a suitable gasket material provides a seal. Couplings 37 of a conventional kind couple to the pipe connections 17, 18.

The canister 31 is typically straight sided and circularly symmetrical about a central axis passing through the open end thereof.

The valve sub-assembly comprises a valve housing 32, with a flange 46, which fits closely within the canister without significant clearance, and a ball valve 33 pivotable in the housing about the axis of symmetry of the canister. A closure plate 38 secured by miniature screws retained the ball valve 33, and defines a bearing for a drive pin 39 which both guides and drives the ball valve. An annular seal 40 is provided between the plate 38 and ball valve 33. An upper pin 41 of the valve housing 32 defines an opposite guide bearing of the ball valve 33.

The closure plate 38 is also sealed to the valve housing by a suitable gasket so as to define a wet/dry interface.

'O' ring seals 42 are provided between the valve housing 32 and the canister 31, as illustrated to further ensure against leaking of liquid from the wet side 11.

The actuator 34 is a close sliding fit within the open mouth of the valve housing 32, and engages a splined drive of the drive pin 39. Further 'O' ring seals 43 are provided between actuator 34 and valve housing 32, principally to prevent ingress of moisture. The actuator is retained by conventional means, for example one or more screw-threaded fasteners, not shown, or by a conventional clamp engaged with the 'L' section foot illustrated in FIGS. 2-4.

Figure 2:
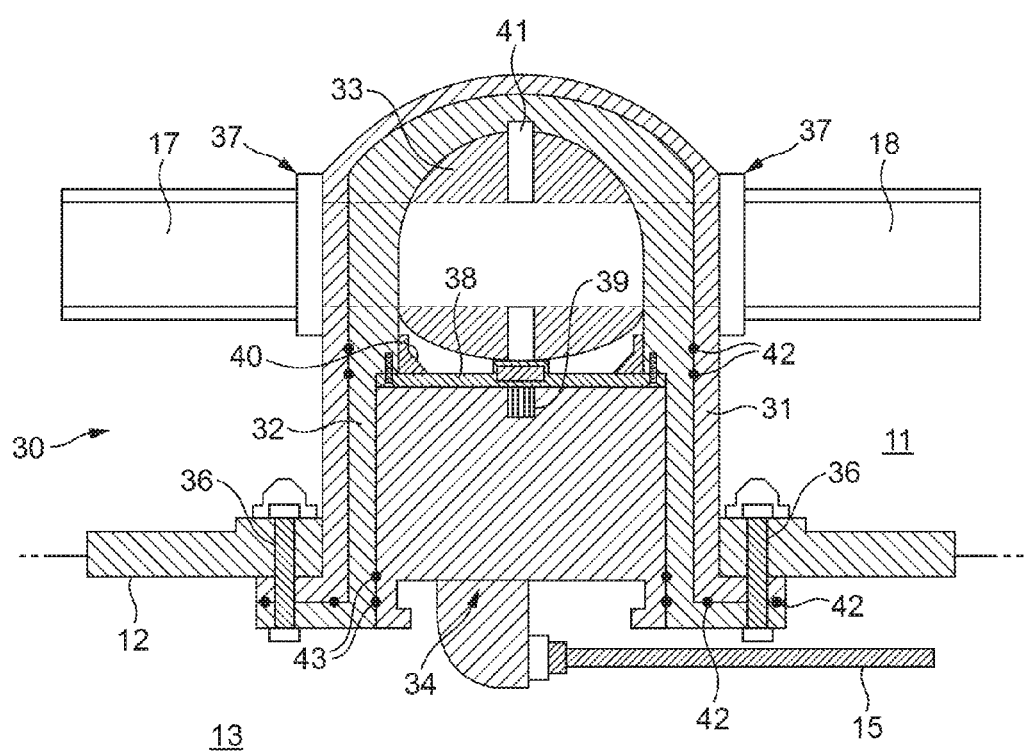
FIG. 2 corresponds to FIG. 1, and illustrates a valve assembly of the invention in axial cross-section.

In use, the valve assembly 30 of FIG. 2 can be manufactured, tested and delivered as a single component for installation through an aperture of a fuel tank wall 12. Couplings 37 are connected and the valve assembly retained by fasteners 36. Installation time is substantially reduced as compared with the prior art assembly of FIG. 1, since both pedestal and actuator mounting are omitted.

Figure 3:
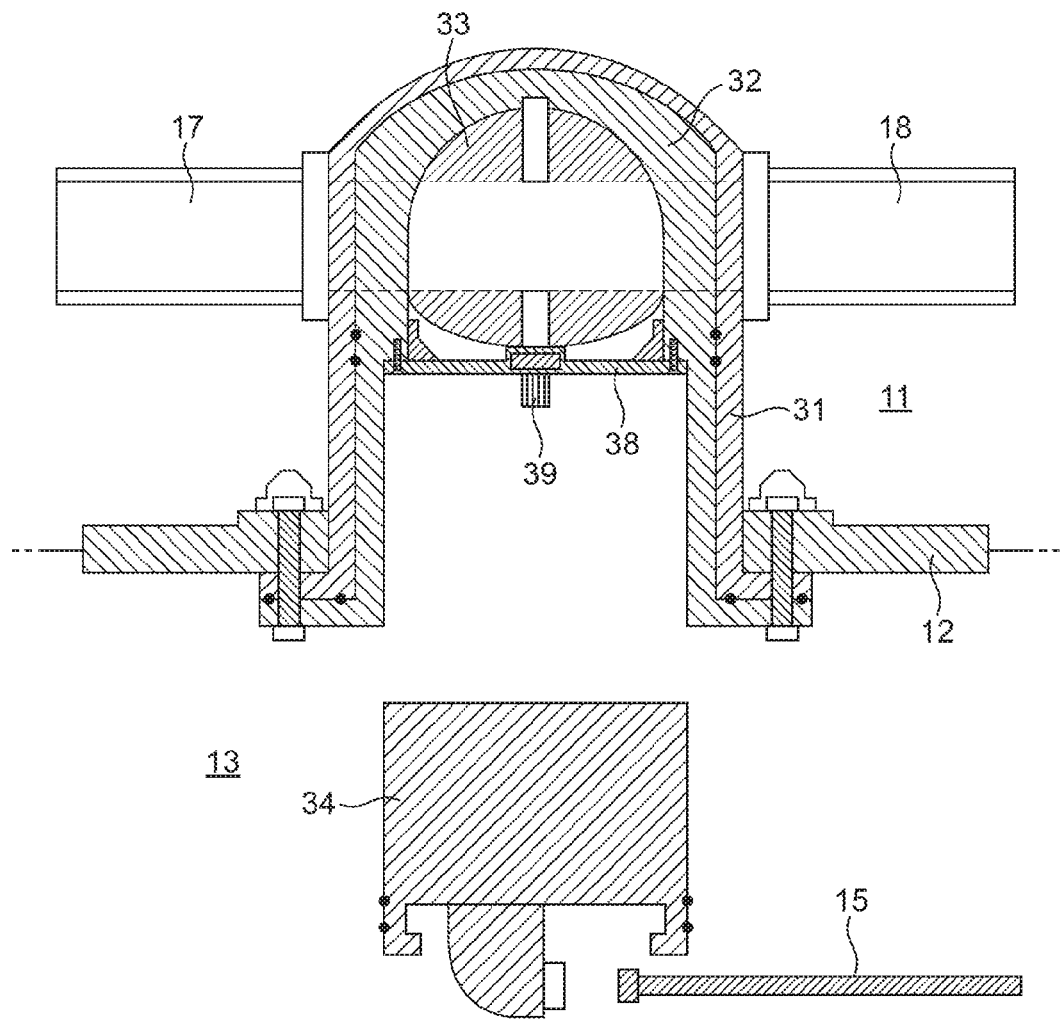
FIG. 3 shows the embodiment of FIG. 2 with actuator removed.
Figure 4:
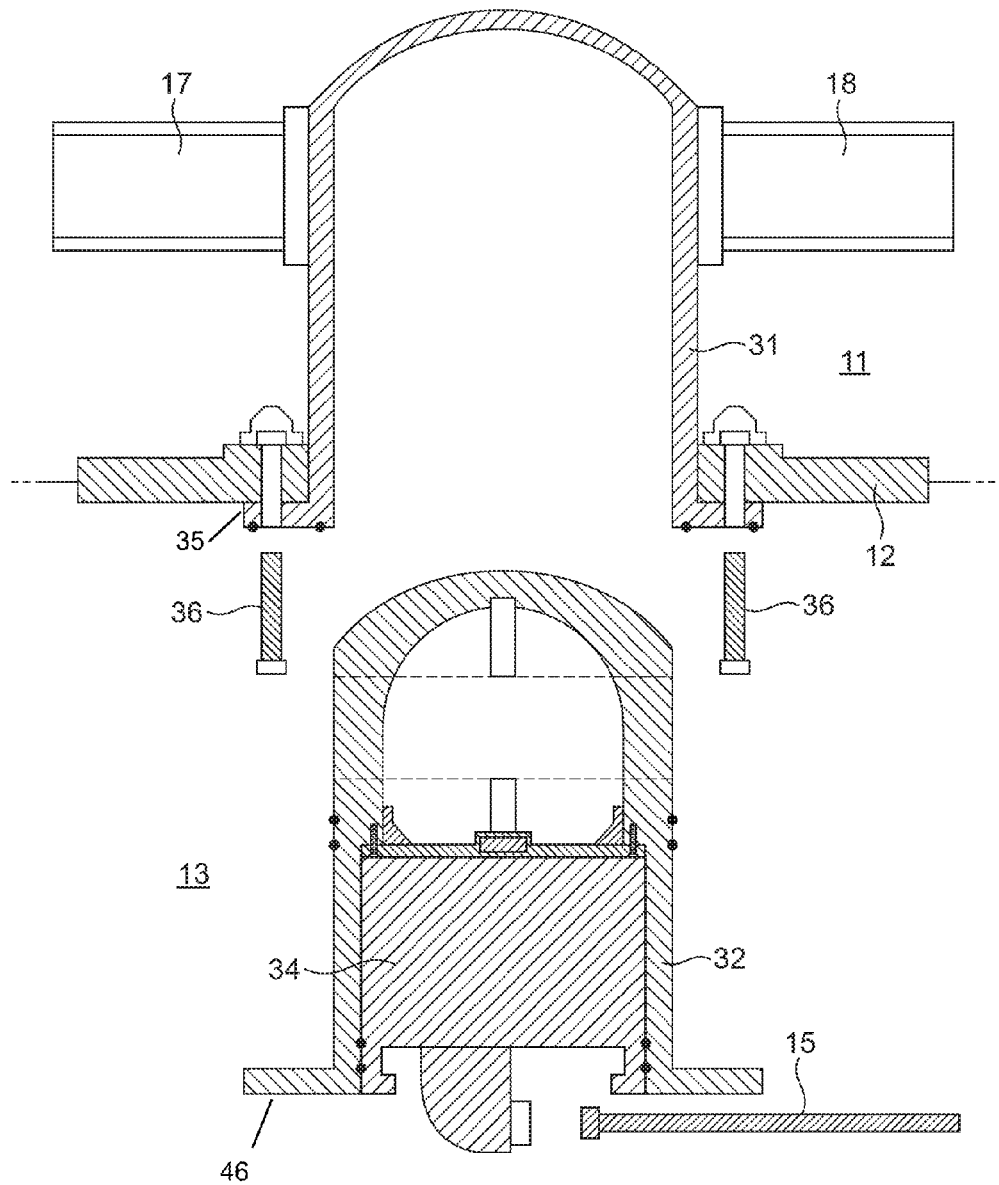
FIG. 4 shows the embodiment of FIG. 2 with valve sub-assembly and actuator removed.

FIG. 3 illustrates in-service removal of the actuator 34 for the purposes of repair or replacement. Removal of the actuator retainer permits removal by a single axial movement, either before or after disconnection of the lead 15. The drive pin 39 is retained in the cover plate 38. The circular seals 43 are arranged for removal with the actuator.

Should the valve sub-assembly require removal (FIG. 4), the fasteners 36 are released after any necessary draining of the fuel pipe connections 17, 18. The valve housing 32 and valve 33 may then be removed by single axial movement along with the circular seals 42. The actuator 34 may be removed in advance or with the valve housing 32.

It will be appreciated that by making the valve housing 32 a close sliding fit within the canister 31, the risk of substantial leakage from the vicinity of the pipe connections can be substantially reduced. The double O-ring provides an adequate seal outboard of the sliding connection between the ports of the canister and housing.

Typically the canister is circular symmetrical, and has a domed end to both resist the pressure of fuel within the tank, and to minimize material content having regard to the part spherical shape of the ball valve and corresponding internal surface of the valve housing. It will be appreciated that a cylindrical valve member may also be suitable in the invention.

Furthermore, there is no necessity to release the couplings 37 to remove the ball valve, and accordingly testing subsequent to reassembly is substantially simplified.

The actuator 34 and/or valve housing 32 may include an orientation feature such as a keyway or flat to ensure appropriate angular positioning within the respective enclosure.

As illustrated, common fasteners retain both the valve housing 32 and the canister 31. In practice it is envisaged that additional or separate fixings are provided to attach the canister to the fuel tank wall, and these may be of a semi-permanent kind such as rivets.

Figure 5:
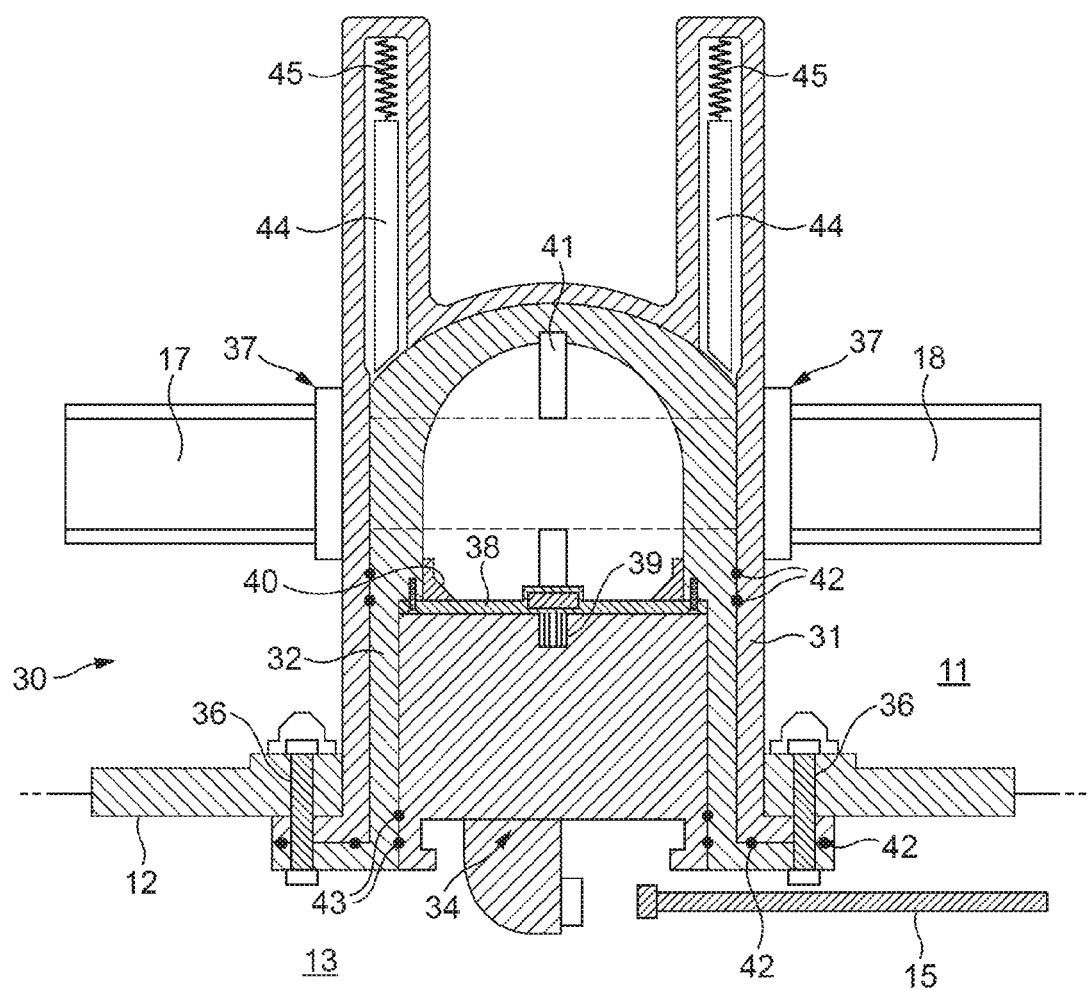
FIG. 5 corresponds to FIG. 2 and shows an alternative arrangement with sluice open.
Figure 6:
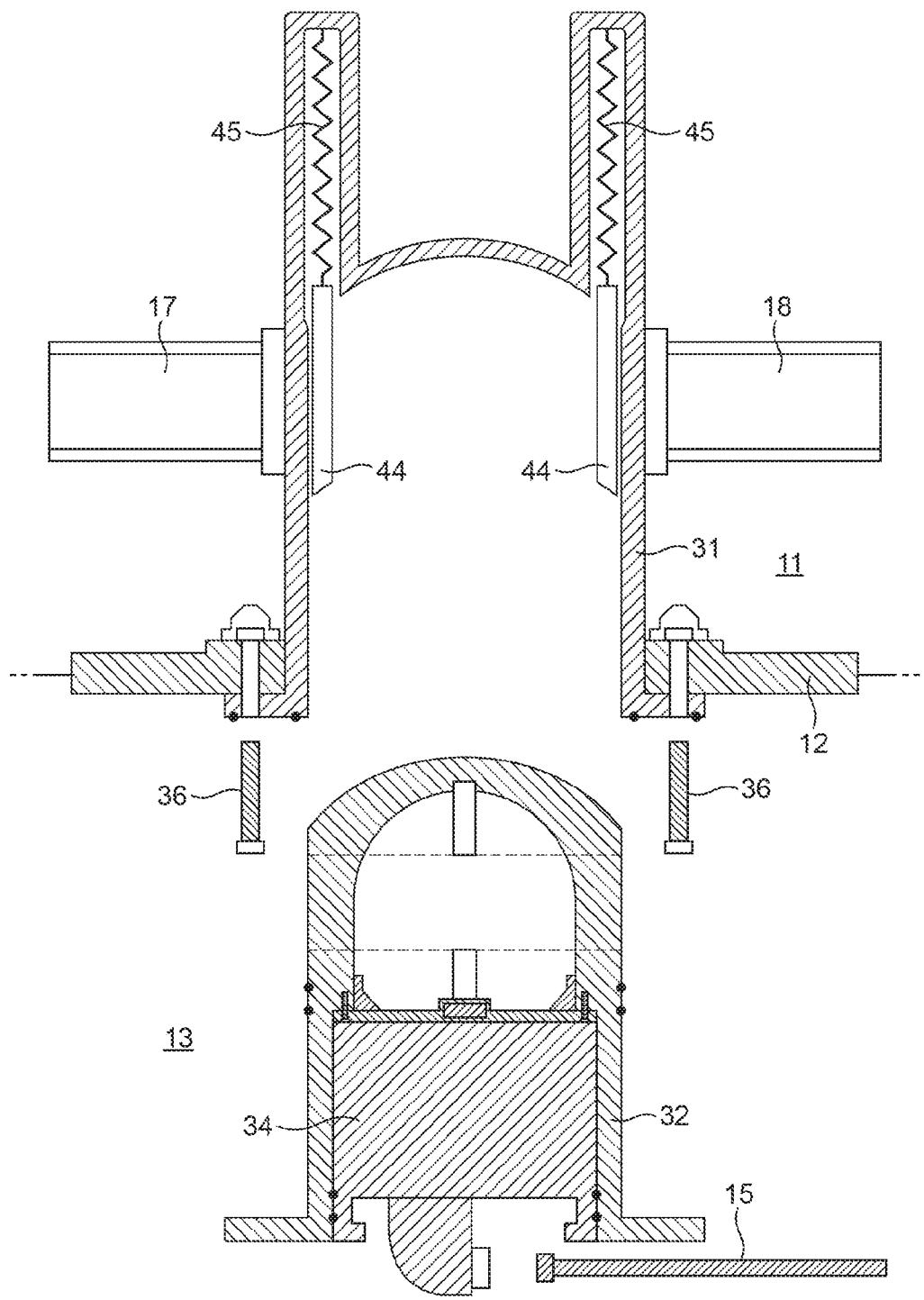
FIG. 6 corresponds to FIG. 4 and shows the alternative arrangement with sluice closed.

In a refinement a spring loaded sluices 44, or a spring loaded sleeve, may be provided between the valve housing 32 and the canister 31, so as to automatically move to a closed condition (in which the ports of the canister are closed) when the valve housing is removed. In such an arrangement insertion of the valve housing into the canister will automatically move sluices 44, or sleeve, to the open condition. Such an arrangement of separate sluices is illustrated in FIGS. 5 and 6, though it will be understood that a single circular sleeve valve may be provided as an alternative.

Suitable face seals would typically be provided for the sliding surfaces. This arrangement can be used where leakage from the pipe connections cannot be tolerated when the valve housing is removed, or to avoid draining of the pipes prior to removal of the valve housing.

Typically the sluices or sleeve valve have a polished corrosion resistant surface finish and slide in precision close-fitting channels having a low friction coating of, for example, PTFE. Spring loading by spring 45 ensures that the inlet and outlet ports are automatically closed when the valve housing is withdrawn. Although not illustrated the maximum extension of sluices 44 or sleeve is restricted, and may for example be determined by a fixed stop or restraint of any suitable kind.

The invention is generally applicable to confined or contained valves, and is suitable for any liquid handling apparatus of the kind including pivotable or rotatable flow control valves. Any suitable materials can be used, according to the conditions of use, and in the described embodiment anodised aluminium alloy and fuel tolerant resilient seals of fluorosilicone rubber are envisaged.

The invention claimed is:

1. A valve assembly comprising:
   a blind canister defining an insertion axis passing centrally through the internal volume and open end thereof;
   a blind valve housing slidable into said canister on said axis and defining an open mouth and a circular chamber about said axis;
   a valve member insertable through said mouth and pivotable in said chamber;
   an actuator insertable through said mouth for operational engagement with said valve member, and
   a closure plate assembly configured as a barrier between the valve member and the actuator, the closure plate assembly comprising closure plate, a bearing and a drive pin configured to engage the actuator and the valve member to provide the operational engagement between the valve member and the actuator, wherein the drive pin is supported by the bearing to permit the drive pin to pivot relative to the closure plate, and wherein the closure plate assembly provides a wet-dry interface between the actuator and the valve member to permit disengagement of the actuator from the drive pin without leakage of fluid from the valve housing chamber; and
   said canister and housing define aligned inlet and outlet ports, and said valve member includes a through passage configured to allow connection of said inlet and outlet ports in one orientation thereof, and configured to obstruct connection of said inlet and outlet ports in another orientation thereof.

2. The assembly according to claim 1, wherein said circular chamber is centered on said insertion axis.

3. The assembly according to claim 1, wherein a pivot axis of said valve member coincides with said insertion axis.

4. The assembly according to claim 3, wherein said chamber is part-cylindrical.

5. The assembly according to claim 3, wherein said chamber is part-spherical.

6. The assembly according to claim 1, wherein said inlet and outlet ports are on an axis perpendicular to said insertion axis.

7. The assembly according to claim 6, wherein said through passage is straight.

8. The assembly according to claim 1, wherein said valve member is journaled in a blind end of said housing.

9. The assembly according to claim 8, wherein said valve member is journaled on the closure plate assembly insertable through said mouth and inboard of said actuator.

10. The assembly according to claim 9, wherein said chamber includes a circular radially outward seat at the mouth thereof for engagement with said closure plate assembly.

11. The assembly according to claim 1, wherein said canister includes a radially outward lip at the open end thereof for engagement with an aperture in which the canister is inserted in use.

12. The assembly according to claim 11, wherein said valve housing includes a radially outward flange at the mouth thereof for engagement with the lip of said canister.

13. The assembly according to claim 12, wherein said flange and lip include fixing holes in register, said holes being configured for fixing said canister and valve housing about an aperture in a wall.

14. The assembly according to claim 1, wherein said housing fits within said canister without clearance.

15. The assembly according to claim 14, wherein a resilient sealing ring is provided between said housing and said canister.

16. The assembly according to claim 1, wherein said actuator is substantially within said valve housing.

17. The assembly according to claim 16, wherein said actuator fits within said housing without clearance between the actuator and the housing.

18. The assembly according to claim 17, wherein a resilient sealing ring is provided between said actuator and said valve housing.

19. A valve assembly comprising:
   a blind canister including an internal volume and an open end, wherein the internal volume and the open end are along an insertion axis;
   a blind valve housing slidable into said blind canister along the insertion axis, wherein the blind valve houses a circular chamber with an open mouth aligned along the insertion axis, wherein the blind canister and the blind valve housing define inlet and outlet ports aligned along a direction transverse to the insertion axis;
   a valve member insertable through the mouth and pivotable in the blind chamber, wherein the valve member including a through passage aligned with the inlet and outlet ports in a first orientation of the valve member and the valve member includes a second orientation which obstructs the inlet and outlet ports;

an actuator insertable through the mouth and in operational engagement with the valve member, and a closure plate assembly configured to form a barrier between the valve member and the actuator, the closure plate assembly comprising a closure plate, a bearing and a drive pin configured to engage the actuator and the valve member to provide the operational engagement between the valve member and the actuator, wherein the drive pin is supported by the bearing to permit the drive pin to pivot relative to the closure plate, and wherein the closure plate assembly provides a wet-dry interface between the actuator and the valve member to permit disengagement of the actuator from the drive pin without leakage of fluid from the valve housing chamber, wherein the actuator is configured to selectively move the valve member to the first and second orientations.

* * * * *